US008946922B1

(12) United States Patent
Johnson

(10) Patent No.: US 8,946,922 B1
(45) Date of Patent: Feb. 3, 2015

(54) REVERSE FLOW HYDROELECTRIC GENERATOR

(71) Applicant: Johnny C. Johnson, Southaven, MS (US)

(72) Inventor: Johnny C. Johnson, Southaven, MS (US)

( * ) Notice: Subject to any disclaimer, the term of this patent is extended or adjusted under 35 U.S.C. 154(b) by 0 days.

(21) Appl. No.: 13/763,981

(22) Filed: Feb. 11, 2013

Related U.S. Application Data

(60) Provisional application No. 61/597,415, filed on Feb. 10, 2012.

(51) Int. Cl.
*F03B 13/10* (2006.01)

(52) U.S. Cl.
CPC ..................................... *F03B 13/10* (2013.01)
USPC ............................................... 290/54; 290/53

(58) Field of Classification Search
USPC ......... 290/43, 54; 415/3.1; 416/85; 60/641.7, 60/398, 641.6
See application file for complete search history.

(56) References Cited

U.S. PATENT DOCUMENTS

| | | | | |
|---|---|---|---|---|
| 1,010,591 A | * | 12/1911 | Clements | 290/55 |
| 3,803,422 A | * | 4/1974 | Krickler | 290/52 |
| 4,307,299 A | * | 12/1981 | Norton | 290/52 |
| 4,670,062 A | * | 6/1987 | Lester | 134/21 |
| 4,703,626 A | * | 11/1987 | Jensen | 60/641.7 |
| 5,295,352 A | * | 3/1994 | Beebe et al. | 60/776 |
| 5,377,485 A | * | 1/1995 | Bellamy | 60/398 |
| 5,780,935 A | * | 7/1998 | Kao | 290/52 |
| 6,023,105 A | * | 2/2000 | Youssef | 290/54 |
| 6,065,956 A | * | 5/2000 | Cornil et al. | 431/90 |
| 6,241,897 B1 | * | 6/2001 | Hanson et al. | 210/739 |
| 6,861,766 B2 | * | 3/2005 | Rembert | 290/43 |
| 7,696,632 B1 | * | 4/2010 | Fuller | 290/54 |
| 8,026,625 B2 | * | 9/2011 | Jones et al. | 290/54 |
| 2003/0025334 A1 | * | 2/2003 | McDavid, Jr. | 290/54 |
| 2003/0066289 A1 | * | 4/2003 | Watten et al. | 60/398 |
| 2008/0116689 A1 | * | 5/2008 | Alstot et al. | 290/43 |
| 2010/0301611 A1 | * | 12/2010 | Vitagliano | 290/54 |

* cited by examiner

Primary Examiner — Tulsidas C Patel
Assistant Examiner — Charles Reid, Jr.
(74) *Attorney, Agent, or Firm* — Wyatt, Tarrant & Combs, LLP; William S. Parks

(57) ABSTRACT

A reverse flow hydro electric turbine electrical generating system is present. It is labeled "reverse flow" in that the flow of the water driving the turbine is flowing against the force of gravity or, essentially up hill. The turbine system is comprised of a penstock for the intake of a flow of water current (as in a river or ocean stream) disposed at a depth equaling from about one atmosphere of pressure to as much as eight or more atmospheres. An amount of air is injected into the stream entering the penstock to about saturate to slightly supersaturate the solution, from which it enters a venturi-type reducer and then is piped upwardly to the turbine assembly. Attached to the top of the turbine assembly is a stand of relief pipes to carry the exhausting water to the surface for discharge.

9 Claims, 8 Drawing Sheets

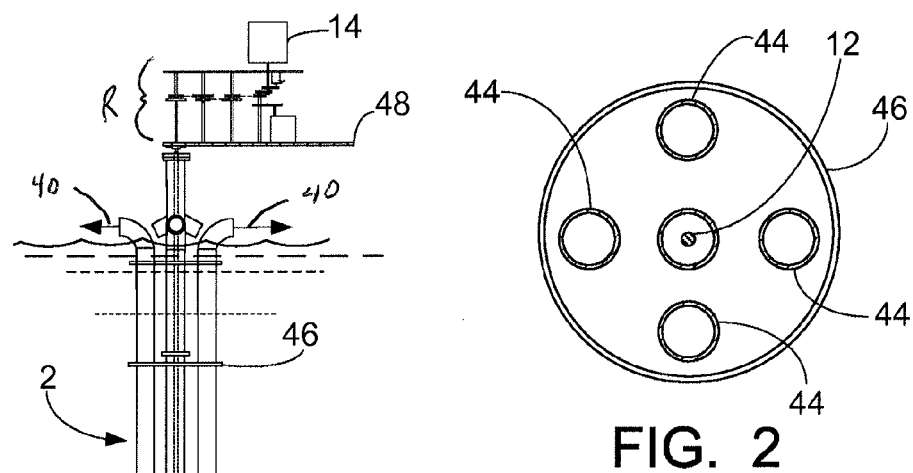
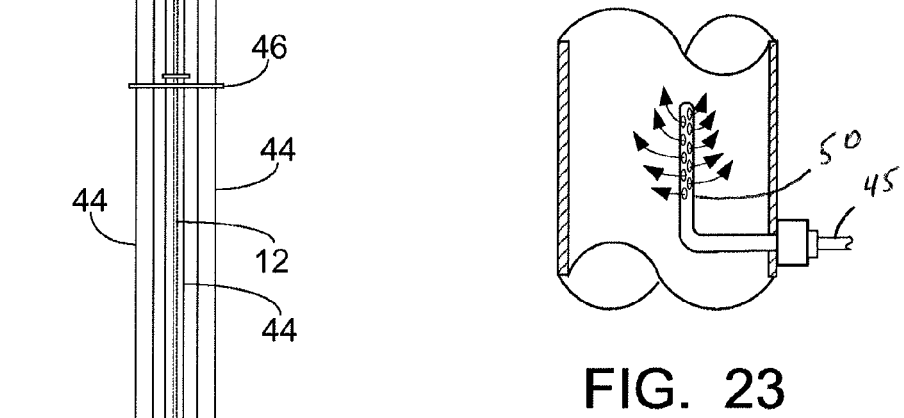
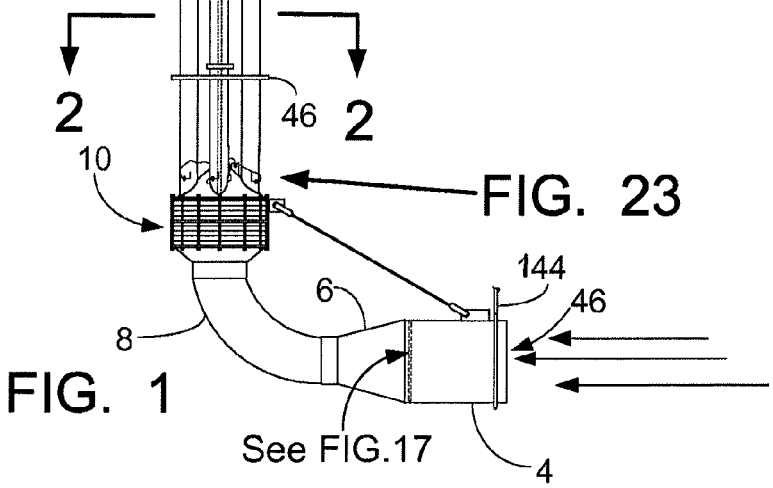
FIG. 2
FIG. 23
FIG. 1

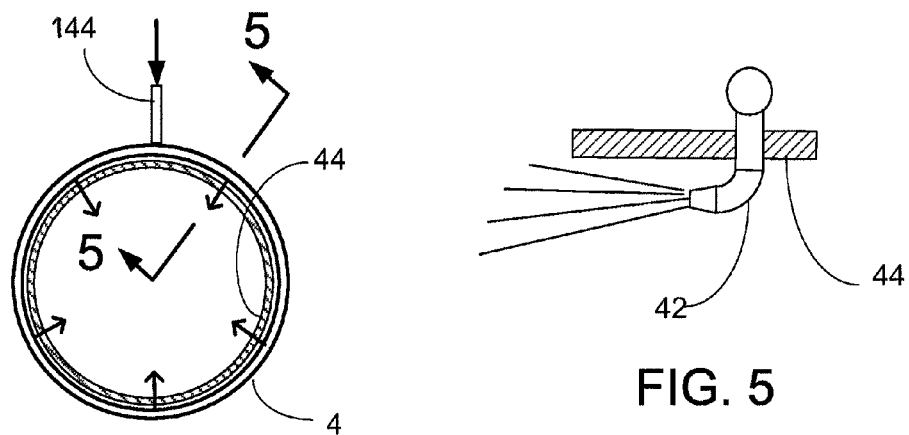
FIG. 4
FIG. 5
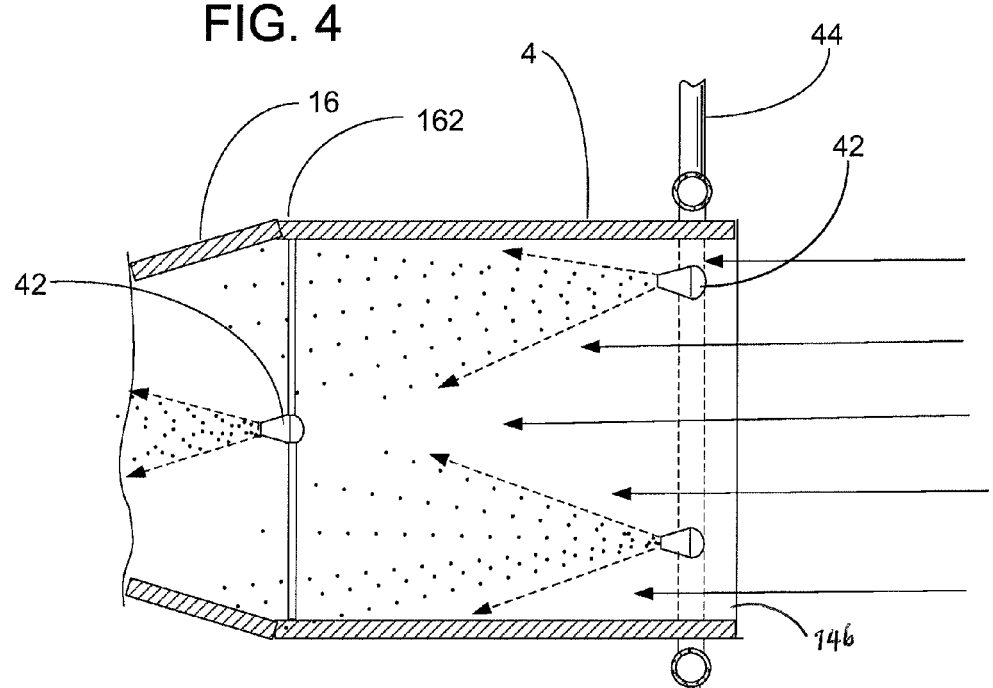
FIG. 3

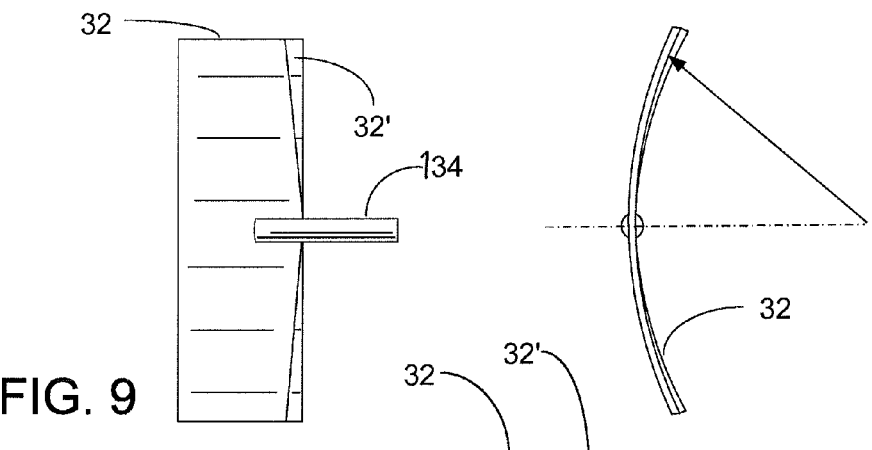
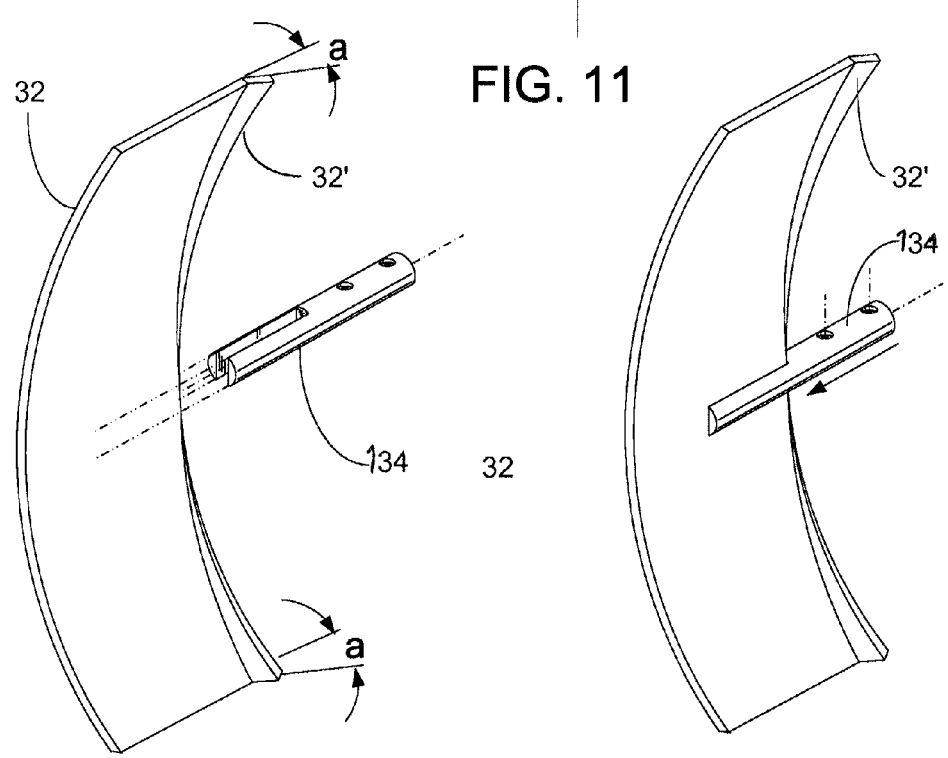
FIG. 9
FIG. 10
FIG. 11
FIG. 12
FIG. 13

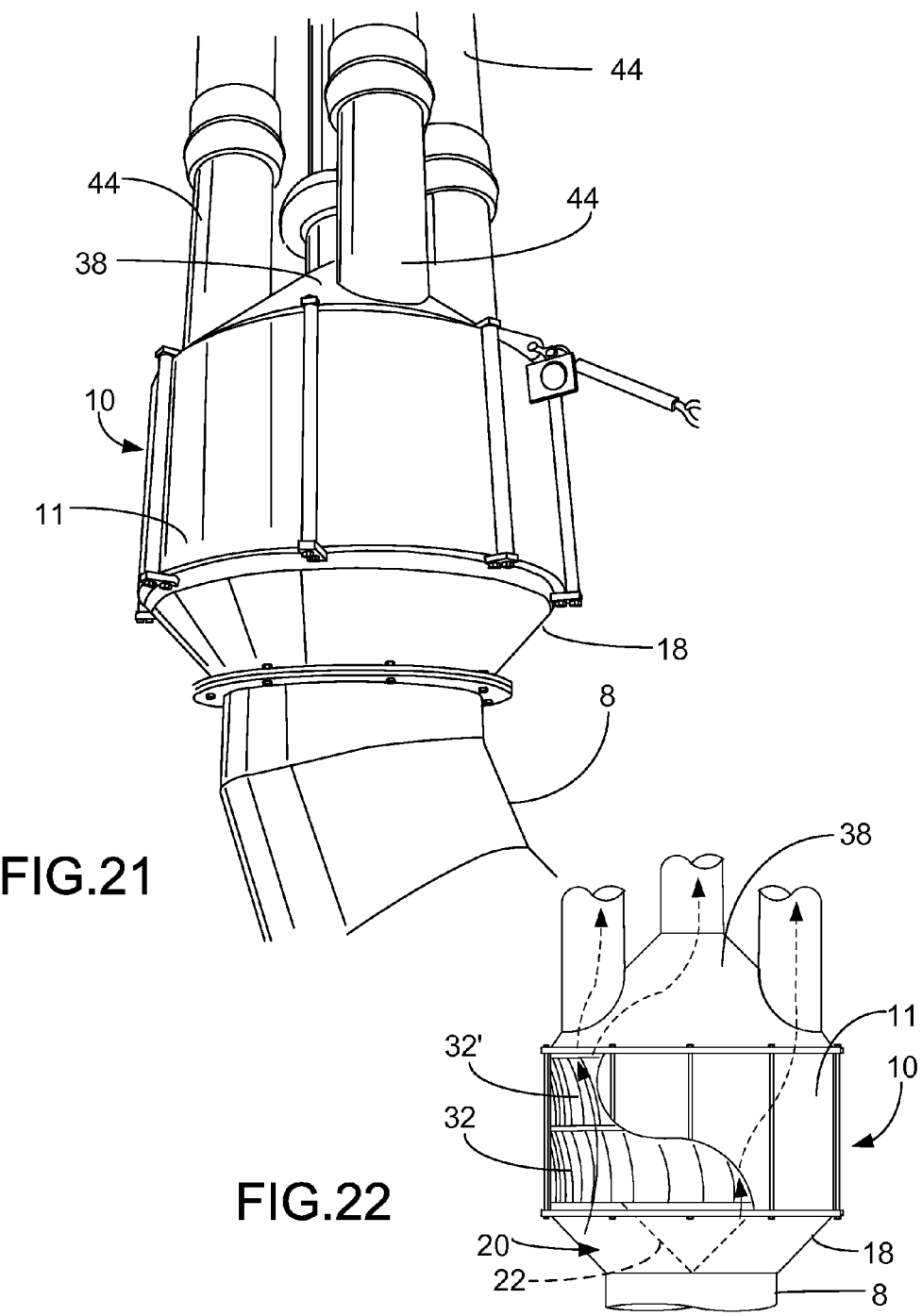

REVERSE FLOW HYDROELECTRIC GENERATOR

CROSS-REFERENCE TO RELATED APPLICATIONS

None

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to a novel hydroelectric power generator wherein naturally flowing currents of bodies of waters such as rivers and coastal currents of oceans can independently supplement natural resources such as conventional hydroelectric plants powered by dams, wind powered systems and water driven submerged fans. The present invention is ideally adapted to ocean currents as exist in the Gulf Stream on the U. S. east coast and the California Current on the west coast of the U. S. These two large U.S. currents have multiple splits and changes in width and depth that provide particularly advantageous higher velocity currents to power the present invention. The present invention would be disposed in the favorable region of a current on a base similar to the platform for an oil rig, whereon there would be an installation composed of multiples of the generators and related support equipment described herein. As should be recognized, many of the favorable sites are sufficiently far off the coastlines of the east and west coasts (perhaps 10 to 14 miles) as to not be visible and distracting as windmill farms.

BACKGROUND OF THE INVENTION

Presently operating hydroelectric poser plants conventionally recover the static energy of water that is contained in an elevated reservoir by being released via a spillway penstock or equivalent conduit to be gravitationally fed to a turbine driving a generator. Approximately one-fifth of the world's electrical energy is generated with this conventional hydroelectric system. In the United States, well over one-half of this production is relied upon to support the electrical power system. Alternative means are continually being sought to generate electrical power, without relying upon plants that otherwise generate harmful exhaust gases. By example, large wind-turbine fields are being developed where prevailing wind currents exist to support the systems. Various water wheels have been tried in moving water systems, from stationary wheels in a flowing river to vessel mounted wheels. There are also windmill type generators mounted under water in a stream with the current driving the windmill/propeller. These systems are limited in size in that blade lengths must be maintained under 8-10 feet in length or the blade will self destruct. An advantageous location for a generator of the present invention would be in the Gulf Stream off the Miami, Ft. Lauderdale area where the current runs around 8 knots. A windmill style of plant would not be possible in that they are limited to sites with 5 knots or less of current.

Thus, continued reliance upon carbon based systems motivates further development such as the present invention, of electrical generators powered by a turbine driven by the flow of a fluid or gas. The motivations are fueled by the harm caused by exhaust gases, fear of exhaustion of the carbon fuel and perceived problems of global warming caused by the burning of fossil fuels.

OBJECTS OF THE INVENTION

The object of the present invention is to provide a water driven generator capable of generating upwards of 5 KW per unit which is environmentally friendly and may be installed in multiples to generate significant quantities of electrical energy. A commercial unit in such as located off shore in the Gulf Stream will be an enlarged system of the present invention being an agglomeration of turbines to drive a plurality of generators of about 2 to 4 megawatts output. Such a location on an oil-rig type platform would include perhaps 20 to 40 generators. The present invention provides a hydroelectric power generation capability without the limitations of those systems based upon the establishment of a large reservoir and the attendant cost, disruption of the topography of the immediate region and argued harmful greenhouse gasses associated with the establishment of a reservoir. Little published are reports that the flooding of a large region for a conventional hydro-electric system leads to the decay of the vegetation, including forests as the plant material rots in the flooded basin. As the rotting begins, a large amount of carbon is released, argued to be two to three times that released by a coal fired plant. Then, as the plant matter continues to decay without oxygen present, a large build-up of methane gas occurs. This is released to the atmosphere when the turbine driving stream exits the power plant.

The present invention may be placed into any stream of sufficient depth and current without major overhaul of the local environment or disruption of the local lifestyle. It is essentially a self-contained operating unit that may be assembled in a variety of output configurations. Adding to its further flexibility, it may be installed in multiple unit configurations in such as a river or ocean/sea current site to provide a substantial energy production power plant. It is anticipated that a commercial embodiment will be of a size that will be set to a depth of 6 to 10 atmospheres, encompassing an overall size and output reflective of the increase over the embodiment disclosed herein.

BRIEF DESCRIPTION OF THE DRAWINGS

FIG. 1 is a pictoral view of the apparatus of the present invention of a hydroelectric generating system.

FIG. 2 is a cross sectional view of the relief conduits of the invention.

FIG. 3 is a cross-sectional view of the intake penstock of the invention.

FIG. 4 is an end view of the penstock of FIG. 3.

FIG. 5 is a cross-sectional view of the air injector of FIG. 3.

FIG. 9 is a front view of a blade of the turbine assembly.

FIG. 10 is a top view of the blade of FIG. 9.

FIG. 11 is an end view of the blade of FIG. 9.

FIG. 12 is an exploded view of the blade of FIG. 9.

FIG. 13 is an assembly view of the blade of FIG. 9.

FIG. 21 is a pictoral view of the turbine assembly and intake and exhaust components.

FIG. 22 is a partial pictoral view of the turbine assembly.

FIG. 23 is a cross-sectional view of the air injection in the relief conduit.

PREFERRED EMBODIMENTS OF THE INVENTION

Figure 6:
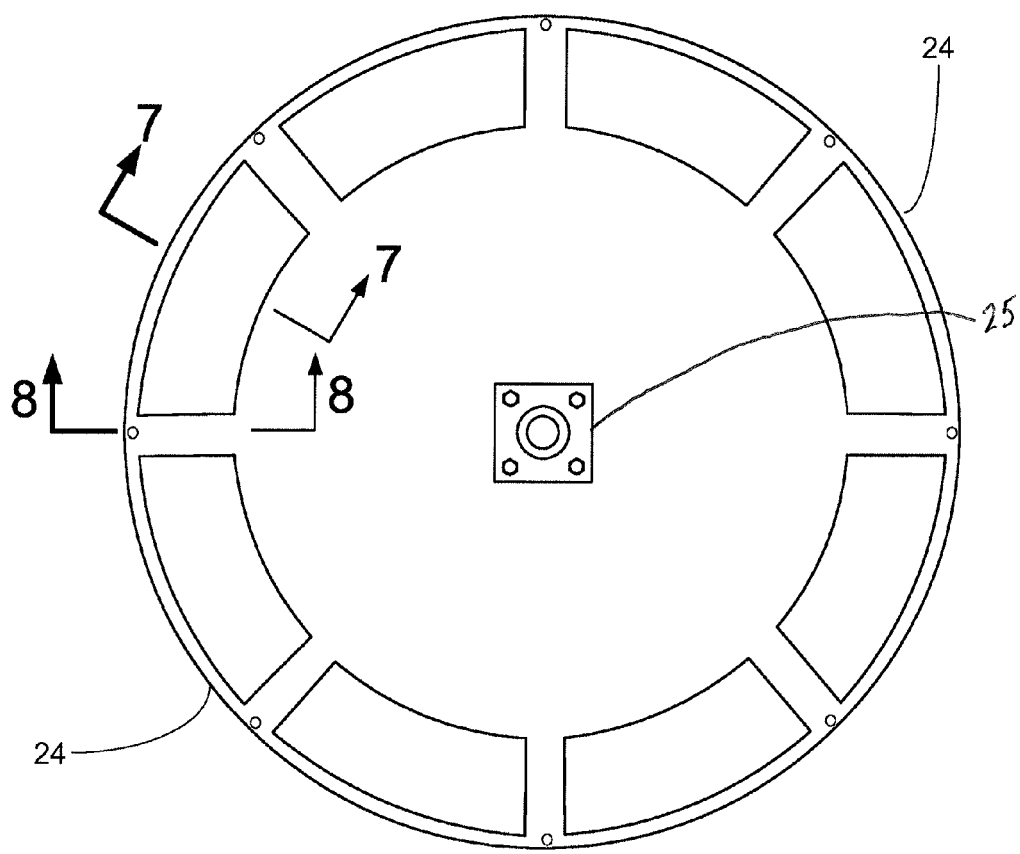
FIG. 6 is a top view of the turbine chamber separator plate.
Figure 7:
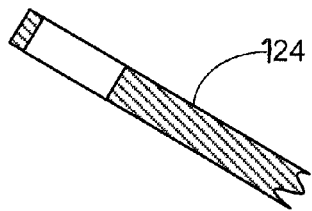
FIG. 7 is a cross sectional view taken along 7-7 of FIG. 6.
Figure 8:
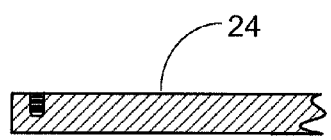
FIG. 8 is a cross sectional view taken along 8-8 of FIG. 6.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

As shown in FIG. 1, the invention of a Reverse Flow Hydro-Electric Turbine 2 referred hereto collectively as the "power plant") is disposed generally vertically in a body of water wherein there is a continuing flow, or current. The power plant is comprised of a penstock 4 being a cylindrical opening for receiving the inflow of water, an accelerator 6 for increasing the velocity of the water inflow followed by a long sweep ell 8 to direct the water flow to a vertical direction where it enters the turbine assembly 10 wherein the axial flow of water is converted to the centrifugal to rotate a drive shaft 12 powering an electrical generator 14 above the surface of the water at the site.

The present invention gets its name from the operation of the turbine in that the water effectively flows upwardly in driving the turbine, rather than the conventional hydro-electric turbine in which the water driving the turbine is collected behind a dam and is released down a spillway to the turbine. As with conventional hydro-electric plants, the capacity of the equipment is matched to the quantity of water energy available to drive the turbine. While a conventional dam reservoir is definite in size and thus the number of operating turbines limited thereto, the present system is limited only to the available space in a river or ocean stream where a sufficient current subsists. Accordingly, the present system lends itself to a plurality of units, as with a wind-farm, which may be disposed in the available region. Likewise, the deeper the water body providing the current, the deeper, and thus the larger, the individual turbine, and perhaps group of turbines that may be efficiently operated.

In the test model of the reverse flow turbine described herein, the unit is sized such that the penstock 4 is positioned one atmosphere (~32 feet) below the surface of the water body. The location is selected based upon there being a continuing current of water of at least about 3 knots to feed the turbine. The penstock 4 in the present embodiment has a diameter of about two and one-half feet. As may be seen in FIGS. 3 through 5, a series of air nozzles 42 are disposed in a feed line 144 and internally of the penstock 4 adjacent its opening 146. In the present embodiment, five such nozzles 42 are utilized. Their function is to accelerate the inward flow and to saturate the incoming water with air without appreciably adding air bubbles to the water. Therefore, nozzles 42 should provide a fine, low pressure injection into the penstock 4.

As the incoming water moves inwardly of the penstock 4, it approaches a venturi-like transition 16 to the sweep ell 8 and the turbine assembly 10. At the venturi entrance 16, a second air injection is provided by nozzle 42 to ensure as much air saturation of the water as may be reasonably accomplished. Again, as with the penstock 4 air injection, the air is dispensed in a fine spray such that any air not absorbed by the water is in very fine bubbles. Those skilled in the art recognize that air bubbles of significant size and/or number in the water feed to a turbine interfere with the energy transfer to the turbine blades and introduce inefficiency into the system. As the water traverses the venturi 16, it accelerates in velocity and the pressure decreases. As the water traverses the sweep ell 8 it approaches the turbine assembly, at the turbine intake cone 18 (FIGS. 21, 22).

Figure 14:
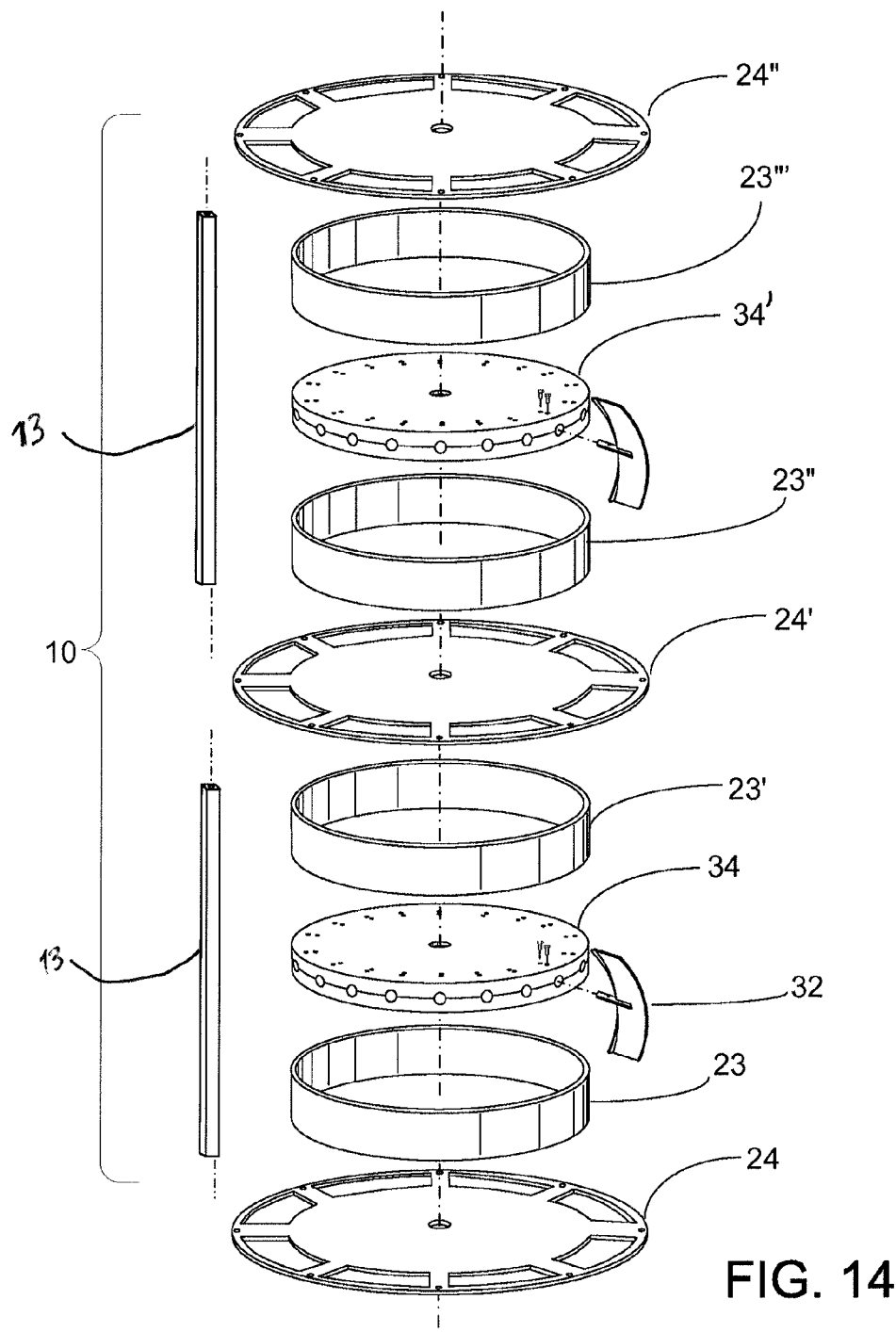
FIG. 14 is an exploded view of the components of the turbine assembly.
Figure 15:
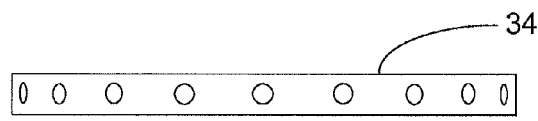
FIG. 15 is an end view of the turbine blade plate of the turbine assembly of FIG. 14.
Figure 17:
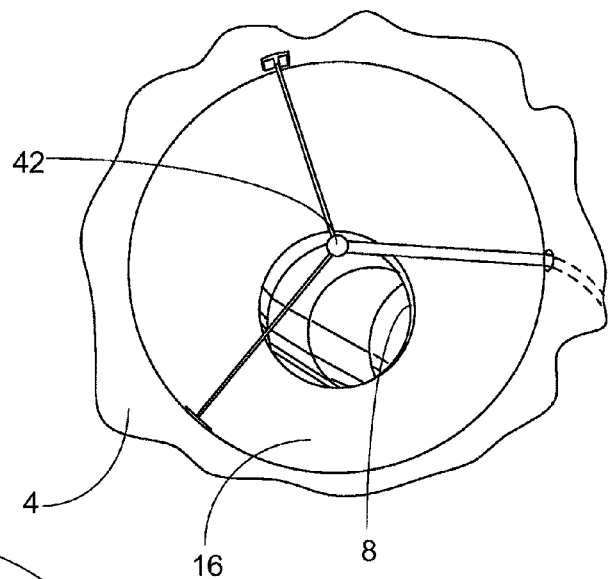
FIG. 17 is pictoral view of the entry chamber of the turbine assembly.
Figure 16:
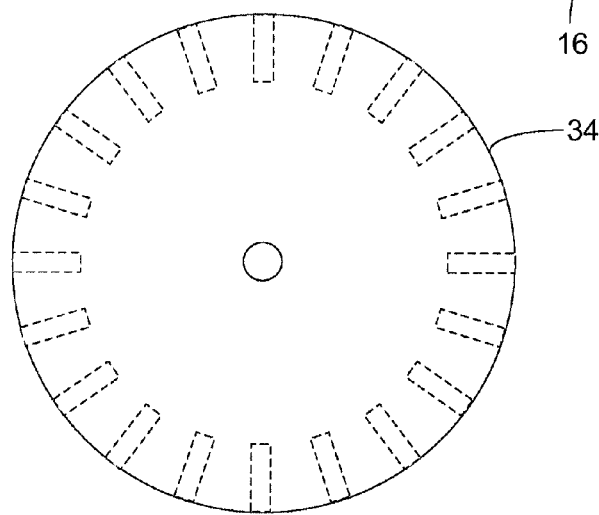
FIG. 16 is a top view of the plate of FIG. 15.
Figure 18:
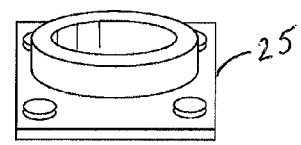
FIG. 18 is a bearing mount of the assembly of FIG. 14.

Referring now to FIGS. 6 through 20, the structure of the turbine assembly 10 is illustrated. FIG. 14 illustrates the several components and the assembly—with the lower flow direction plate 24 disposed on the top of the turbine intake cone 18 (FIGS. 21 and 22) upon which first chamber separator 23 is disposed. The chamber separators together with the turbine outer housing 11 define the blade chambers 21 through which the water flows to drive the turbine blades 32. Turbine wheel 34 is disposed on the drive shaft 12 (not shown, but which extends from the turbine assembly through the central relief pipe to the platform 48 as shown in FIG. 1) between the first 23 and second 23' chamber separators for the first turbine wheel 34. Drive shaft 12 is supported in each of the flow direction plates 24 by a flange bearing 25. The second turbine flow direction plate 24' separates the first 21 and second 21' turbine wheel blade chambers and is identical in construction to the first. Turbine wheel chamber separators 23' and 23" are disposed on either side of the second turbine wheel 34' and are secured to the turbine direction flow plates 24' and 24". The assembly is secured by bars 13 attached to the flow direction plates 24.

Intake cone 18 defines the transition of the sweep ell 8 to the turbine housing. Internal of the intake cone 18 is the swirl chamber 20, the volume of which is determined by the intake cone and swirl cone 22 (FIG. 22) and the turbine entry plate 124 containing (in the present embodiment) eight entry openings for the water to enter the turbine assembly 10. Disposed on the swirl cone 22 are a plurality of swirl vanes 26 to redirect the entering water stream to an impact angle of about 30° to about 60° to effect as complete a transfer of energy to the turbine blades 32 (FIG. 19) as reasonably possible. In the traverse of water through the swirl chamber 20 and into the turbine assembly 10, the pressure of the water increases, forcing any entrained air therein into solution, further optimizing the transfer of the water energy to the turbine assembly 10, via rotation of the turbine blades 32 mounted on the turbine wheels 34, 34'.

Referring now to FIGS. 9 through 13, the structure of the turbine blades 32 may be appreciated. For the embodiment described, the blade 32 subscribes an arc of about seven to nine inches of a circle having a diameter of about 18 to 22 inches. The blade height is about seven inches and preferably includes a vortex generator adaption 32' which advances from nil at the center to about one half inch at the lateral edge and at an angle α of about ten to about thirty degrees. The outside diameter of the turbine is about 36 inches and the inside diameter is about 30 inches. The blades are about 7 inches in height. The generator 14 is disposed on the inward (toward the center of rotation) aspect of the blade 32. Blades 32 are affixed to the rotating disc (turbine wheel) (34 of FIG. 14) by a post 134. For the described system, the blades 32 are disposed on blade disc (again, turbine wheel) (34 of FIG. 14) at an angle of about forty-five degrees to about sixty degrees. As may be seen in FIG. 21A, the swirl vanes 26 are disposed at an angle of about twenty to about forty degrees to orient the incoming flow of water to strike the blades 32 at close to perpendicularly, so as to transfer as much energy as possible.

Figure 19:
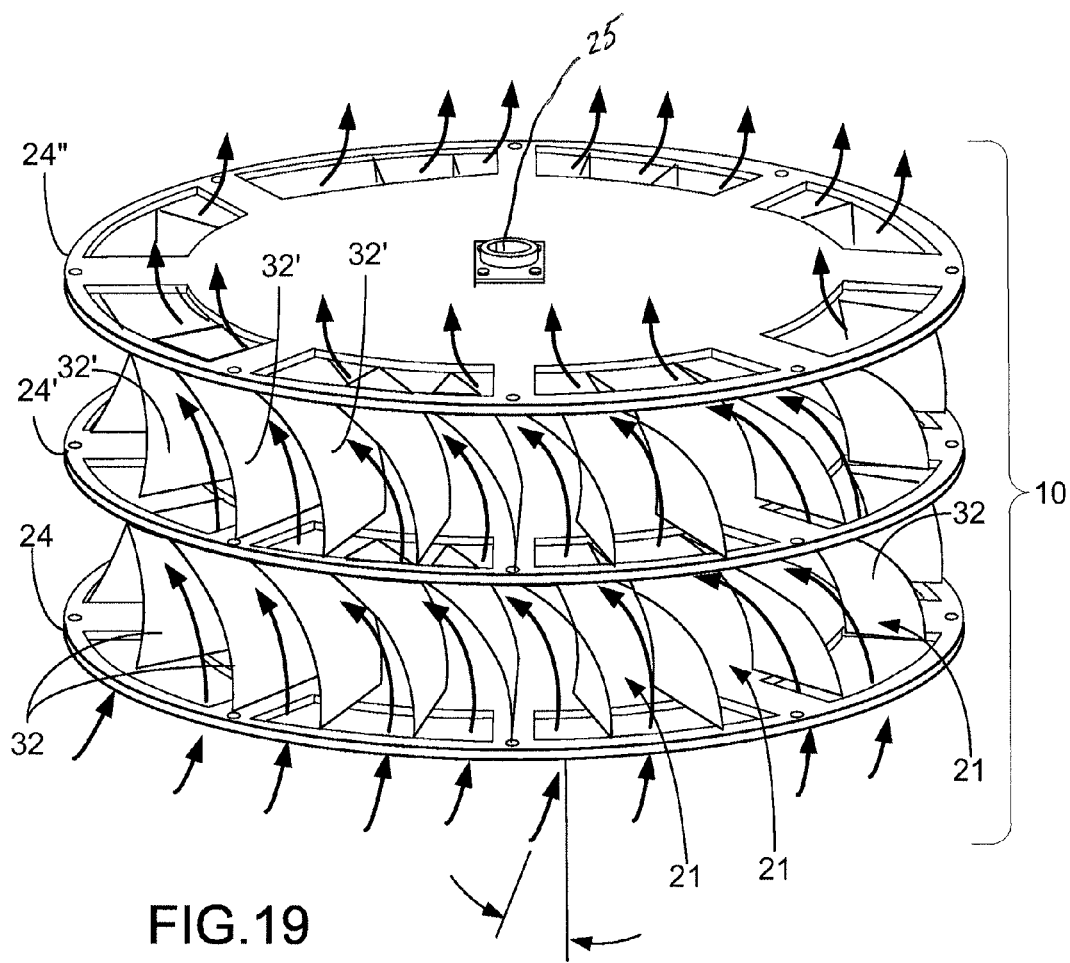
FIG. 19 is a partial view of the turbine blade assembly.
Figure 20:
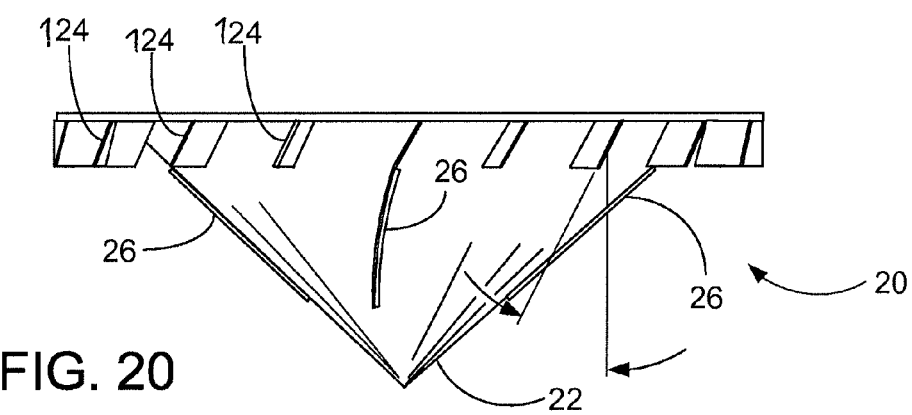
FIG. 20 is a side view of the intake cone of the turbine assembly.

As illustrated by the arrows in FIG. 19, the water flow continues through the turbine assembly 10, first the first set of turbine blades 32 and then the second set of turbine blades 32', after passing through turbine entry plate 24' disposed between the respective blade wheels 32 and 32' to exit the turbine assembly via the turbine discharge bell 38. As may be seen in FIGS. 21, 22, and 23, discharge bell is disposed to collect the water exiting the turbine assembly and to accelerate its flow to the tailraces 40 at the water surface. To accommodate the rapid flow of the exiting water, five relief pipes 44 are bundled as by support plates 46. The central relief pipe 44' houses the drive shaft 12 which extends to above the water surface to a platform 48. As may be seen in FIG. 1, the platform 48 supports the electrical generator 14 driven by shaft 12 through gear reduction R. Additionally on the platform is an air compressor to supply air to the penstock 4 air nozzles 42 and the exit air nozzles 50 (FIG. 23) described subsequently.

Each of the relief pipes 44, immediately above the discharge bell 38 includes an internal air tube 45 and nozzle 50 to supply compressed air to the exiting water. The supply of air (third stage air injection) accelerates the water up the relief pipes to the water's surface. By the combination of the introduction of additional air, a steady decrease of ambient pressure is effected to allow the entrained air to expand, lowering the pressure of the air-water mix and expediting the exit of the water. The further effect of the expediting the exit of the water from the relief pipe is to maximize the flow of water through the turbine assembly 10 and thus, the delivery of energy to drive the generator 14.

As related previously, the present embodiment is sized for prototype demonstration and evaluation. It is envisioned that service units will be constructed on a larger scale for operation at from four to eight atmospheres. Accordingly, the general sizes and operating parameters will be proportionately (generally linearly) increased over those related herein, as within the expertise of one skilled in the art. It is further anticipated that in the commercial general drive will be by a hydraulic system wherein the output of the turbine 10 drives a hydraulic pump, the output of which is carried to the electric generator 14 where a hydraulic drive will power the generator 14.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A reverse flow hydroelectric turbine electrical generating system being driven by a flowing body of water comprising:
   an intake penstock disposed at least one half atmosphere of pressure below the water surface;
   a venturi reducer disposed upstream of the water inflow to said penstock;
   a sweeping-ell conduit disposed upstream of said venturi reducer and configured to redirect the intake stream of water from said intake penstock and said venturi reducer to an upward direction;
   a turbine intake chamber disposed above and connected to said sweeping-ell conduit;
   a turbine assembly disposed above said intake chamber having therein at least one turbine wheel assembly including turbine blades to be powered by the upward flow of water;
   a turbine discharge chamber disposed above the turbine assembly for collecting the water discharged from said turbine assembly; and
   at least one relief pipe conduit attached to said turbine discharge chamber extending upwardly at least to the water surface;
   wherein said relief conduit houses a drive shaft driven by said turbine wheel assembly and connected to an electrical generator disposed above the water surface adjacent said generating system; and
   wherein said penstock, venturi reducer and relief conduit include independent means for introducing pressurized air into the system at their respective locations.

2. The system of claim 1 wherein the turbine blades include a vortex generator section.

3. The system of claim 1 wherein the turbine discharge chamber is connected to a hydraulic pump for converting the water discharge energy to hydraulic power.

4. The system of claim 3 wherein the electrical generators are driven by hydraulic power.

5. The system of claim 1 wherein the intake chamber includes swirl vanes to redirect the intake stream of water to centrifugal flow feeding said turbine blades.

6. The system of claim 1 wherein said independent means for introducing pressurized air present within the intake penstock is at least one air injector including at least one feed line and at least one air nozzle.

7. The system of claim 1 wherein said independent means for introducing pressurized air present within the venturi reducer is at least one air injector including at least one feed line and at least one air nozzle.

8. The system of claim 6 wherein said independent means for introducing pressurized air present within the venturi reducer is at least one air injector including at least one feed line and at least one air nozzle.

9. The system of claim 1 wherein said an intake penstock, said venturi reducer, said sweeping-ell conduit, said turbine intake chamber, said turbine assembly, said turbine discharge chamber, and said at least one relief pipe conduit are included within a single apparatus.

* * * * *